United States Patent

Cirri

[11] 3,969,944
[45] July 20, 1976

[54] SENSOR FOR ACCELEROMETERS
[75] Inventor: Gianfranco Cirri, Florence, Italy
[73] Assignee: Fabbrica Italiana Magneti Marelli, S.p.A., Milan, Italy
[22] Filed: Dec. 26, 1973
[21] Appl. No.: 431,070

[52] U.S. Cl. .......................................... 73/516 LM
[51] Int. Cl.² ........................................ G01P 15/12
[58] Field of Search .............. 73/516 LM, 514, 515; 200/61.47

[56] References Cited
UNITED STATES PATENTS

| | | | |
|---|---|---|---|
| 1,317,072 | 9/1919 | Carlier | 73/516 LM X |
| 1,319,036 | 10/1919 | Barus | 73/516 LM |
| 2,063,495 | 12/1936 | Elsom | 73/515 X |
| 2,165,894 | 7/1939 | Hohndorf | 73/515 X |
| 2,831,183 | 4/1958 | Womack | 200/61.47 X |
| 2,870,280 | 1/1959 | Kraus | 200/61.47 X |
| 3,015,958 | 1/1962 | Dove | 73/516 LM |
| 3,232,119 | 2/1966 | Salerno | 73/516 LM X |
| 3,530,726 | 9/1970 | Young | 73/516 LM |
| 3,817,625 | 6/1974 | Jordan | 356/141 |

FOREIGN PATENTS OR APPLICATIONS

| | | | |
|---|---|---|---|
| 589,804 | 3/1959 | Italy | 33/366 |

Primary Examiner—James J. Gill
Attorney, Agent, or Firm—Ostrolenk, Faber, Gerb & Soffen

[57] ABSTRACT

An accelerometer sensor comprising two vertically disposed tubular passages communicating at their bottom; the passages and the connection therebetween being partially filled with a conductive liquid; an electrical resistor in each passage; a conductor communicating into the liquid; an electrical circuit for detecting the resistance unbalance in the resistors, due to the shifting liquid caused by acceleration.

2 Claims, 7 Drawing Figures

SENSOR FOR ACCELEROMETERS

This invention relates to a sensor for accelerometers, particularly adapted to operate on motor-vehicles.

Several designs of such devices are known at present, but suffering from operation and use restriction drawbacks.

It is the object of the present invention to overcome the inherent disadvantages in the prior art devices by adopting an accelerometer sensor capable of assuring:
a. maximum measurement accuracy;
b. capability of measuring several acceleration ranges;
c. regularity in the boundaries of said ranges; and
which is also of a simple and sturdy construction.

An accelerometer sensor according to the invention is characterized by comprising:
1. an insulating body provided with at least two inner tubular passages extending from bottom to top and interconnecting at the bottom through a chamber also formed in the body;
2. a resistor located in each of said passages and having its upper end projecting from the insulating body;
3. an electrical conductor sealingly passing through the bottom of the body and terminating in the chamber, the outer ends of said resistors and conductors being set for connection to an electrical circuit for detecting any unbalances in the resistor resistances;
4. a conductive liquid completely filling said chamber and partially filling the passages so as to assure for each acceleration rate within the measuring range the electrical connection between the resistors and conductor; the whole so that due to acceleration the conductive liquid will assume different levels in the passages, involving different portions of the resistors and thereby causing an unbalance in the resistances which is used for measuring the acceleration.

According to the invention, the tubular passages containing the resistors and conductive liquid are arranged on a vertical plane containing the movement direction of the vehicle on which the sensor is installed. Moreover, said passages may be rectilinear or curvilinear and, in the former case, may take a more or less sloping pattern on the horizontal to the vertical. Accordingly, also the chamber communicating said passages, may assume different shape and arrangement.

The conductive liquid preferably used is mercury, although salt solutions or the like could be used. As apparent, the higher specific gravity of mercury is a benefit for a lower oscillation of the free level or surface.

The different sloping of the rectilinear tubular passages, and hence of the relative resistors, affects the amplitude of the measuring range, and inversely the device sensitivity. Particularly, the curvilinear shape allows progressive changes in said two characteristics and, thus, by a suitable selection for the curve, more appropriate values can be obtained for such characteristics in determined intervals.

The device can be provided with means for minimizing or eliminating the liquid oscillations and means for adjusting the level thereof in the passages.

The invention will now be described in detail with reference to some embodiments, given by mere way of example and shown in the accompanying drawings in which.

Figure 1:
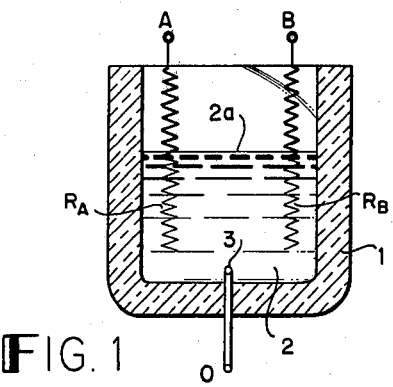
FIG. 1 is a schematic view showing a sensor under the conditions of zero acceleration, given for illustrative purposes of the operation.
Figure 2:
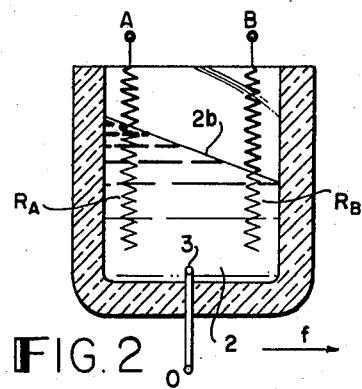
FIG. 2 shows the sensor of FIG. 1 when undergoing some acceleration.

Referring to the drawings and particularly to FIGS. 1 and 2, the sensor comprises an insulating beaker or bell, such as of glass, containing a conductive liquid, preferably mercury. Two resistors $R_A$ and $R_B$ having a same resistance are partially immersed in the mercury and vertically arranged, having the respective upper terminals A and B projecting from the beaker or bell, while the lower terminals are always immersed and thereby electrically connected by the mercury to the electrical conductor 3 sealingly passing through the beaker bottom and externally having the terinal O.

The liquid 2 partially fills the beaker or bell, so that under inoperative or uniform motion conditions it is horizontally arranged (FIG. 1) according to a plane 2a, whereby the resistance in the two parallel legs A-3 and B-3 is identical. On the contrary, when the sensor is subjected to a direct acceleration, for example in the direction of arrow f, the mercury will arrange according to the inclined plane 2b, and thus the resistance in the leg A-3 is lower than that in the leg B-3. Therefore, upon acceleration, an electrical unbalance is built up between the terminals A and B, which can be used for measuring such an acceleration.

The statement in connection with FIGS. 1 and 2 is essentially theoretically valid and serves only to illustrate the sensor operating principle, it being of course apparent that such a device could not be practically feasible on motor-vehicles and the like.

Figure 3:
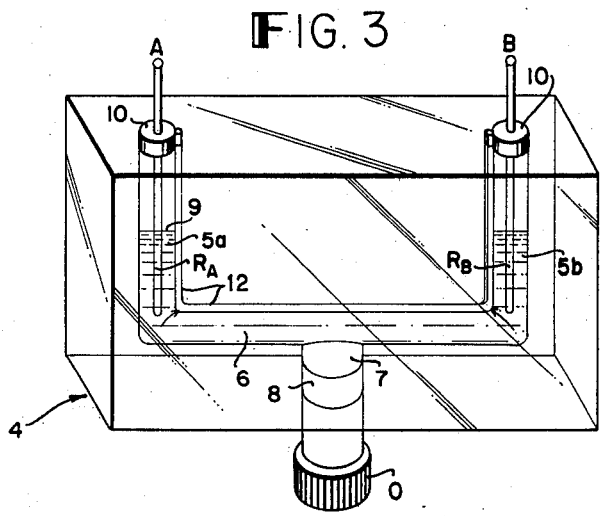
FIG. 3 is a perspective view showing a first embodiment of a sensor according to the invention.

A first practical embodiment of a sensor according to the invention is shown in FIG. 3. In this embodiment, the insulating body 4 comprises a parallelepiped block, such as of plexiglas, wherein two vertical tubular passages 5a and 5b are formed, as well as a third horizontal and also tubular passage, forming the inner body chamber intercommunicating the passages 5a and 5b.

A vertical conductor 8 sealingly penetrates from outside through an aperture 7 on the body bottom into said chamber, and more particularly at the center line thereof; this vertical conductor 8 being configurated as a piston and outwardly terminating with a shaped terminal O which along with the terminals A and B is connected to an external electrical measuring circuit.

The conductive liquid 9 completely fills the chamber 6 and partially fills the channels 5a and 5b, as shown in the drawing, so as to ensure the electrical connection between each of the rod-like resistors $R_A$ and $R_B$, coaxially inserted in the respective passage 5a and 5b, and the electrical piston conductor 8-O. In the particular embodiment shown, the latter is provided also for adjusting the level of the conductive liquid, thus allowing calibrating operations which may be required to compensate for volume changes due to heat.

To this end, the terminal O is suitably shaped to allow an improved handle or grip for the user.

The resistors $R_A$ and $R_B$ are maintained coaxial within the respective passages 5a and 5b by means of plugs 10 of a suitable material or putty, said resistors sealingly passing therethrough. The sealing of the passages 5a and 5b by the plugs 10 enables to use the air entrapped at the top of the conductive liquid as a cushion for dampening the liquid oscillations.

Alternatively to the air cushion, a suitable and obviously insulating liquid could be used.

In the embodiment shown, the vertical passages 5a and 5b and the horizontal channel 6 are of circular cross-section 11 and communicate with a cavity in a channel 12 serving the purpose of preventing the mercury column from being ruptured as a result of impacts or high vibrations. See FIG. 7. The channel 12 is of smaller cross-section than that of tubular passage 11 and extending substantially the entire length of that said passage (as in FIG. 6) or extending from one tubular passage over the chamber 6 to the other tubular passage (FIG. 3).

Preferably, the resistors $R_A$ and $R_B$ are provided from film of suitable material, as deposited on $Al_2O_3$ substrate.

Figure 4:
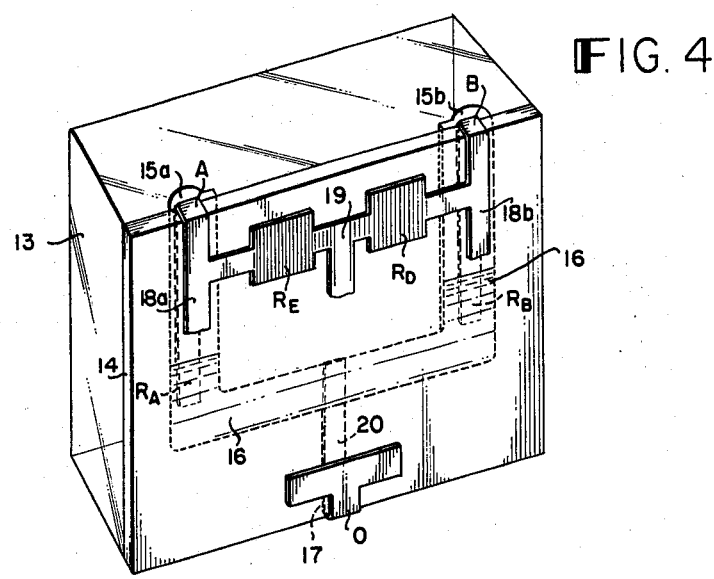
FIG. 4 is also a perspective view showing a second embodiment thereof.

The embodiment shown in FIG. 4 is a modification to that shown in FIG. 3 and enables to use the techniques of hybrid modules.

The insulating body, still of parallelepiped shape, is obtained through the connection of two parts or elements: a plexiglas block 13 and a ceramic plate 14. On its connection face, said block 13 has two vertical axis channels 15a and 15b, which, similarly to the embodiment of FIG. 3, communicate with a third horizontal channel or chamber 16. Said face also has a vertical groove 17 leading from the bottom to the center line of said channel 16.

The ceramic plate 14 is suitably attached to the splined face of block 13, so as to close the channels 15a, 15b and 16, turning the same into tubular passages. Furthermore, the plate 14 has the resistors $R_A$ and $R_B$ applied on the inner face, so as to be accommodated within the respective channels 15a and 15b. Said resistors are then folded over the outer face of the plate, terminating thereat with arms 18a and 18b which in turn are connected to further two resistors $R_E$ and $R_D$ carried by an element 19.

Finally, the plate carries a conductor element 20, accommodating within the groove 17 suitably provided in said block 13 and extending with a flap on the outer face, so as to form the terminal O for connection with the electrical measuring circuit. The other terminals comprise the points A and B of the resistors $R_A$ and $R_B$.

The provision of the resistors $R_E$ and $R_D$ is generally advantageous in measuring circuits based on the bridge system. The two-piece construction of the insulating body provides both a saving in the cavity execution, and the possibility of using a hybrid module of ceramic plate carrying the measuring electronics on the outer face and the resistors $R_A$ and $R_B$ on the inner face. It should be noted that for the sake of simplicity, the passage closing plugs have not been shown in FIG. 4, and for the same reason the device for adjusting the level of the conductive liquid has not been applied to the channel-chamber 16.

Figure 5:
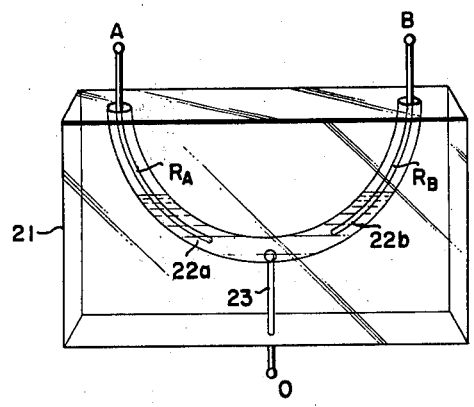
FIG. 5 shows a third embodiment, in which the tubular passages have a curvilinear pattern.

In the embodiment shown in FIG. 5, the two passages 22a and 22b, formed in the plexiglas block 21, are curvilinear and extend according to a semi-circumference. At the lowermost central zone, the two passages provide an intercommunicating chamber, the conductor 23 passing through the bottom and outwardly projecting with the terminal O, terminating therein. Actually, this chamber has no cross-section discontinuities with respect to said passages and, as in the foregoing cases, it contains the conductive liquid for connecting the resistors $R_A$ and $R_B$ with the conductor 23.

Figure 6:
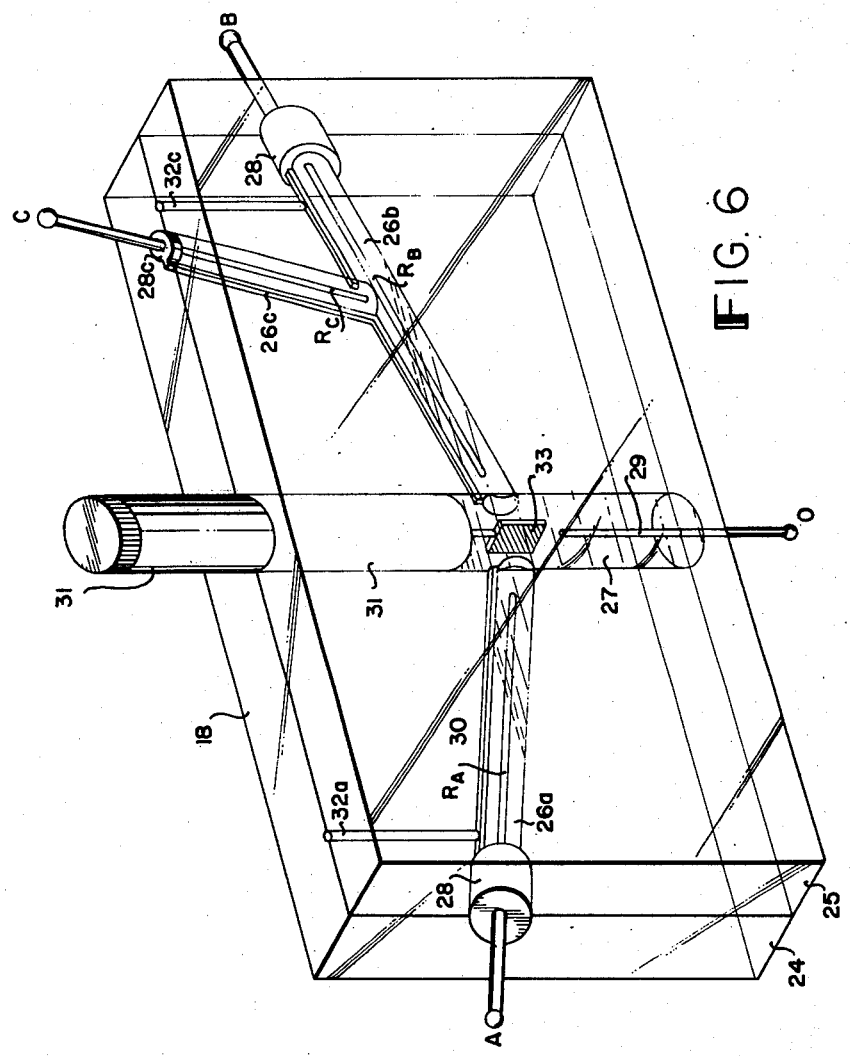
FIG. 6 is another perspective view showing a further embodiment of a sensor provided with three resistors for measuring two different acceleration ranges.
Figure 7:
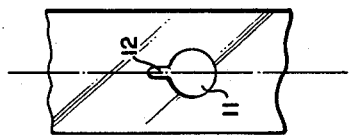
FIG. 7 is a view showing a detail relating to the cross-section of the tubular passages.

In the embodiment shown in FIG. 6, the insulating body is still made of two parts or elements 24 and 25, which are joined along the plane containing the tubular passages and intercommunicating chamber. More particularly, the two passages 26a and 26b are rectilinear and sloping to the center to terminate in the cylindrical chamber 27 vertically extending within the body up to the top base.

The resistors $R_A$ and $R_B$ are the same as those previously described, as well as the plugs 28, the respective terminals A and B exiting therefrom. The through conductor 29 is also the same as that shown in FIG. 5 and has the terminal O on the outside.

The connection between the resistors and conductor is assured by the mercury filling up the chamber 27 and partially the passages 26a and 26b.

The level adjusting device 30 comprises a piston 31 sealingly slidable within the conduit 27. This adjustment results in air ejection or admission through the channels 32a and 32b provided therefor. Thus, the oscillation damping can also be adjusted. A flat 33 is integrally carried at the inner end of the piston 31 and, depending on the angular position controlled by the piston, will oppose a different resistance to the movement of the liquid fluctuating between the two passages 26a and 26b, thus adjusting the damping thereof. When a same apparatus is to be used for measuring two different acceleration ranges, provision can be made for a third resistor $R_C$ accommodated within a passage 26c also rectilinear and coplanar to the other two passages, but more or less inclined thereto, depending on the characteristics of the other range to be measured. Thus, in the case of a higher acceleration range than the former, the sloping of passage 26c will be larger, as shown in FIG. 6, where this passage merges at an intermediate location of passage 26b, to terminate on the top base of the body, from which also projects the terminal C of resistor $R_C$ through the sealing plug 28c. Unlike the embodiment shown in FIG. 5, this approach enables to measure two acceleration ranges.

In the several embodiments shown, the damping of the conductive liquid can be also controlled by means of a conduit having an adjustable cross-section and connecting the two upper portions of the tubular passages, as shown by broken lines in FIG. 3, where C designates the conduit and R a valve device for varying the cross-section.

What is claimed is:

1. An accelerometer sensor comprising: an electrically insulating body having a bottom portion and a top portion; said body being provided with at least two internally located tubular passages extending between said bottom portion of said body and said top portion, at said bottom portion of said body, the two said passages are intercommunicating and a chamber also being formed near said bottom portion of said body in which said passages intercommunicate; an electric resistor located in each of said passages and each said resistor having an upper end projecting from said insulating body; an electrical conductor sealingly passing from an outer end outside said body through said bottom portion of said body and terminating in said chamber, said upper ends of said resistors and said outer end of said conductor being connectable to an electrical circuit for detecting the resistance unbalances in said resistors; a conductive liquid completely filling said chamber and partially filling said passages, so as to assure for each rate of the acceleration within the measurement range that, due to acceleration, said conductive liquid will assume different levels in said passages, involving different portions of said resistors and thereby causing the resistance unbalance which is used for measuring said acceleration; a piston vertically sliding within said connection chamber for adjusting the liquid level; to dampen the fluctuations of the conductive liquid from one said passage to another, there is a level adjusting piston carrying a flag and said flag being located in said chamber, said flag, depending on its angular position controlled by said piston, selectively resists the flow oscillations between said passages.

2. An accelerometer passage as claimed in claim 1, characterized in that three intercommunicating rectilinear tubular passages are formed in said insulating body, of which at least two said passages have a different sloping to the horizontal, so as to allow for measuring two different acceleration ranges.

* * * * *